United States Patent [19]

Ueda

[11] Patent Number: 4,945,495
[45] Date of Patent: Jul. 31, 1990

[54] IMAGE MEMORY WRITE CONTROL APPARATUS AND TEXTURE MAPPING APPARATUS

[75] Inventor: Tomoaki Ueda, Kyoto, Japan

[73] Assignee: Daikin Industries, Ltd., Osaka, Japan

[21] Appl. No.: 260,513

[22] Filed: Oct. 20, 1988

[30] Foreign Application Priority Data

Oct. 21, 1987 [JP] Japan ................................. 62-266855
Oct. 28, 1987 [JP] Japan ................................. 62-272861

[51] Int. Cl.⁵ .......................... G06F 3/00; G06F 15/66
[52] U.S. Cl. ..................................... 364/518; 364/900; 364/920.7
[58] Field of Search ... 364/518, 521, 522, 200 MS File, 364/900 MS File; 358/104; 340/723, 729; 382/41

[56] References Cited

U.S. PATENT DOCUMENTS

| | | | |
|---|---|---|---|
| 4,298,954 | 11/1981 | Bigelow et al. | 364/900 |
| 4,545,068 | 10/1985 | Tabata et al. | 382/41 |
| 4,791,582 | 12/1988 | Ueda et al. | 364/522 |
| 4,811,411 | 3/1989 | Hashihara et al. | 382/41 |

Primary Examiner—Gary V. Harkcom
Assistant Examiner—Michael A. Jaffe
Attorney, Agent, or Firm—Beveridge, DeGrandi & Weilach

[57] ABSTRACT

An image memory write control apparatus includes an image memory unit which is divided into a plurality of block memories. For each of the block memories there are provided a double buffer memory and a timing control circuit. Based on the contents of lower digits of coordinate data supplied from a linear interpolation operation unit, there are generated control signals for designating the functions of the two memory planes of each of the double buffer memories, and for selecting the block memories for receipt of image data from a designated memory plane.

20 Claims, 14 Drawing Sheets

IMAGE MEMORY WRITE CONTROL APPARATUS AND TEXTURE MAPPING APPARATUS

BACKGROUND OF THE INENTION

1. Field of the Invention

The present invention relates to an image memory write control apparatus and a texture mapping apparatus incorporating this image memory write control apparatus. More particularly, the present invention relates to a novel-type image memory write control apparatus capable of writing data to a memory unit without interrupting the arithmetic operation of a linear interpolation operation unit (hereinafter referred to as a DDA), and to a texture mapping apparatus incorporating this novel-type image memory write control apparatus.

2. Description of the Relevant Art

In a graphic display apparatus, it is required to increase the capacity of the image memory unit with the entire cost decreased. Accordingly, a static random access memory unit (hereinafter referred to as a SRAM) is hardly used, but a dynamic random access memory unit (hereinafter referred to as a DRAM) is generally used.

However, when the DRAM is used as an image memory unit, the time required for accessing to the DRAM is about 230 to 400 nsec, although the DDA takes about 50 nsec for generating one-pixel data. It is therefore required that, while all necessary pixel data are written into the image memory unit, the arithmetic operation of the DDA is frequently interrupted. This disadvantageously increases the time required for writing pixel data to the image memory unit, resulting in considerable increase in time required for displaying the image.

To overcome such problem, a graphic display apparatus of the raster scanning type as shown in FIG. 16 is proposed, which apparatus includes:

buffer memories 72a, 72b for temporarily holding a predetermined number of pixel data along the scanning line supplied from a DDA 71, an image memory unit 73 to which a predetermined number of pixel data are supplied from the buffer memories 72a, 72b; and a timing control circuit 74 for controlling the changeover of the buffer memories 72a, 72b and for supplying a memory timing signal to the image memory unit 73.

The arrangement above-mentioned is hereinafter referred to as the double buffer method. In this double buffer method, there are available the following two methods:

(1) a 1×8 double buffer method by which only 8-pixel data in the scanning line direction are held; and (2) a 4×4 double buffer method by which held are 16-pixel data of 4 pixels in the scanning line direction for each of 4 pixels in a direction at a right angle thereto.

In either method as above-mentioned, it is possible to lower the frequency of interrupting the arithmetic operation of the DDA due to long access time required for accessing to the image memory unit 73. This enables improved speed at which pixel data are written into the image memory unit 73 as to the entire image to be displayed. This results in certain improvement in image display speed.

The following description will discuss in more detail both methods above-mentioned.

According to the double buffer method, while the DDA 71 supplies pixel data to one buffer memory, the other buffer memory supplies pixel data to the image memory unit 73. That is, even though pixel data are written to the image memory unit 73 by one buffer memory, This enables reducing the frequency of interrupting the arithmetic operation of the DDA 71. Consequently, this improves the speed at which pixel data are written into the image memory unit 73 as to the entire image.

Particularly, according to the 1×8 double buffer method, 8-pixel data in the scanning line direction which are successively supplied from the DDA 71, are temporarily held in either buffer memory alternately, and 8-pixel data are written into the image memory unit 73 from the buffer memory to which no pixel data are being supplied from the DDA 71. Accordingly, when carrying out an operation including the high probability that pixel data are continuous in the scanning direction as in a polygon filling operation, the time required for writing data into the image memory unit can be considerably shortened.

More specifically, even though the time required for writing data into the image memory unit 73 is eight times that required for generating pixel data by the DDA 71, the time required for writing data of each pixel is equal to the time required for generating data of each pixel by the DDA 71. It is therefore not required to interrupt the DDA 71, except for a refresh operation of the image memory unit 73, an operation for reading data from the image memory unit 73, and the like. This shortens the entire time required for writing data into the image memory unit 73.

However, when drawing a line segment inclined with respect to the scanning direction, the number of pixel data to be simultaneously written into the buffer memories is decreased. This inevitably causes the arithmetic operation of the DDA 71 to be interrupted for a relatively long period of time while data are being written into the image memory unit 73. This results in increase in entire time required for data writing.

More specifically, when drawing a line segment inclined, for example, at 45° or more with respect to the scanning direction, only one pixel data are written during one cycle of writing data into the image memory unit 73 by the buffer memory concerned (See FIG. 17). It is therefore sufficient that the DDA 71 carries out an operation for one pixel data above-mentioned. Accordingly, even though the DDA 71 is capable of operating at a speed of eight times the speed at which data are written into the image memory unit 73, the DDA 71 is obliged to interrupt its arithmetic operation for the period of time during which the arithmetic operation would be carried out for the remaining seven pixel data (See FIG. 18).

In the 4×4 double buffer method, each buffer memory has a memory area for data of four pixels in each of the scanning line direction and a direction at right angle thereto. Accordingly, maximum four pixel data may be held not only in the scanning direction, but also in a direction inclined with respect thereto. In this connection, when there is used the DDA 71 capable of operating at a speed of four times the speed at which data are written into the image memory unit 73, the one-pixel data writing speed may be made substantially equal to the operating speed of the DDA 71.

However, when the positional relationship between a line segment to be drawn and the buffer memory is changed, there are instances where only two or one pixel data are written by one data writing into the image memory unit 73. In the former case, the DDA is obliged to interrupt its arithmetic operation for the period of time during which the arithmetic operation would be carried out for the remaining two pixel data, as shown in FIG. 20.

In summary, even though the DDA 71 is improved in operating speed or even though the buffer memories 72a, 72b are increased in capacity, the DDA 71 may be inevitably obliged to interrupt its arithmetic operation, dependent on the conditions of lines to be drawn. This results in considerable variations of the time required for writing, into the image memory unit 73, pixel data for line segments inclined at an arbitrary angle with respect to the scanning direction.

There has been increased demand for design or image effects made by projecting a desired area of a figure previously supplied from an image input device, or a figure drawn by a figure drawing device, on the surface of a desired solid figure. To satisfy such demand, there has been provided texture mapping apparatus for projecting and displaying a desired two-dimensional figure on a desired three-dimensional figure.

There is known a texture mapping apparatus in which a two-dimensional figure to be mapped (hereinafter referred to as a texture original figure) is divided in line segments in the scanning line direction, and the line segments thus obtained are subjected to an inverse perspective transformation for each pixel while the line segments are being scanned on the plane in which the figure to be visually displayed is defined (hereinafter referred to as the display plane) in the scanning line direction ("What is the Texture Mapping (1)", in the Collection of Lectures and Theses [III]by Takeshi SHIBAMOTO and Makoto KOBAYASHI, Association of Data Processing, Published in Sept. 9, 1985).

In the texture mapping apparatus arranged as above-mentioned, it is required to carry out a matrix operation for each pixel, creating a problem of slow processing speed and necessity for additional memory. Further, accurate mapping cannot be always achieved dependent on the combination of unit polygons constituting a texture original figure with unit polygons constituting a figure on the display plane. More specifically, the texture original figure and the figure on the display plane is crushed into unit polygons (for example triangles). Between corresponding triangles, mapping from one triangle to another triangle is performed by carrying out matrix operation. But matching between the neighboring triangles may go wrong, and as a result inaccurate mapping may be achieved. This disadvantageously presents deterioration in quality of figure data displayed on the display plane.

To overcome the problems above-mentioned, the inventor has proposed a texture mapping apparatus (U.S. Pat. Application Ser. No. 410,017 which is a continuation of Ser. No. 100,677, which is abandoned), the outline of which is set forth below.

Two opposite sides on a display-side unit polygon area are linearly interpolated, and two opposite sides on a texture-side unit polygon area are linearly interpolated, and the line segments determined based on the linear interpolation data obtained by the operations above-mentioned are synchronously interpolated. Based on the address data obtained by the line-segment interpolation operation at the texture side, data are read out from the mapping memory and supplied to the display plane. Accordingly, no additional memories are required and mapping figure of high quality may be displayed at a high speed.

However, this texture mapping apparatus is not still capable of achieving the operation at the desired higher speed, and needs to be further improved.

The following description will discuss in detail the points to be improved.

To draw, at a high speed, a vector oriented to an arbitrary direction (hereinafter referred to as a random vector) in a graphic display apparatus, the image memory unit has to have capacity greater than the capacity necessary for actual display. For example, when only $1280 \times 1024$ pixels are to be displayed, the use of five 256K-bit DRAMs may provide a sufficient memory area. However, since the bit width of each DRAM is four, the 20-bit width is merely obtained as a whole. Further, the number of DRAMs is five, and this number cannot be expressed in terms of involution of 2. This fails to achieve data input/output at a sufficiently high speed. Further, when the capacity of the image memory unit is set to $2048 \times 1024$ pixels, the memory area necessary for these pixels is provided by eight DRAMs. The entire bit width becomes 32, and the number of the DRAMs may be expressed in terms of involution of 2. This enables data input/output at a sufficiently high speed. However, the latter case inevitably produces a vacant area for $768 \times 1024$ pixels. When this vacant area is used as a texture mapping memory area, the necessity for additional memories is eliminated. This provides a great advantage in view of simplification of the arrangement.

In the texture mapping apparatus above-mentioned proposed by the inventor, however, mapping of one pixel requires access to be made to different addresses in the image memory unit. Accordingly, even though the linear interpolation operation unit operates at a high speed, much time is required for access to the image memory unit. As a whole, the texture mapping speed is not improved so much.

SUMMARY OF THE INVENTION

It is an object of the present invention to speed up an operation for writing pixel data into an image memory unit, regardless of the inclined angle of a line segment to be drawn with respect to the scanning line direction.

It is another object of the present invention to enable pixel data to be written into the image memory unit without interrupting the arithmetic operation of a DDA for generating pixel data at a speed higher than the memory access speed.

It is a further object of the present invention to provide a texture mapping apparatus incorporating a novel-type image memory write control apparatus.

It is still another object of the present invention to project pixel data on the desired area on a plane in which a figure to be mapped is defined (hereinafter referred to as a texture plane), onto the desired area of a three-dimensional figure on a display plane.

In order to achieve the objects above-mentioned, the image memory write control apparatus in accordance with the present invention includes:

an image memory unit having a plurality of block memories;

a plurality of double buffer memories; and a plurality of timing control means adapted to receive coordinate data supplied from a DDA, to decode the contents of predetermined digits of the coordinate data thus received, and to generate decode signals, based on which there are generated control signals by which pixel data are written into the image memory unit through the double buffer memories concerned;

each of the double buffer memories and each of the timing control means being disposed for each of the block memories.

Preferably, the timing control means are adapted to decode the contents of predetermined digits of the coordinate data in the scanning direction thereby to generate control signals based on which the double buffer memories concerned are switched in a plane, and also to decode the contents of predetermined digits of the coordinate data in a direction at right angle to the scanning line direction thereby to generate control signals based on which the double buffer memories concerned are selected. The lower digits above-mentioned may be the least significant digits or predetermined lower digits. As to the coordinate data in the scanning direction, however, the predetermined digits may preferably be predetermined lower digits which are defined by the capacity of the double buffer memories.

Preferably, the timing control means are adapted to also receive drawing completion signals supplied from the DDA, thereby to generate control signals based on which the double buffer memories concerned are switched in a plane.

Preferably, the image memory unit is constituted by a plurality of block memories each having a predetermined storage capacity, and each of the block memories is divided into two portions to which different image data are to be respectively stored. In this case, each block memory unit is preferably formed by a dual-port DRAM.

In accordance with the image memory write control appartus having the arrangement above-mentioned, when writing pixel data generated by the DDA into the image memory unit, the pixel data may be generated at all times without interrupting the arithmetic operation of the DDA. Further, while the pixel data thus generated are temporarily held in the buffer memories, the pixel data may be successively written into the image memory unit. This improves the speed at which entire data are written into the image memory unit.

More specifically, it is now supposed that the time required for executing an arithmetic operation in the DDA is t1 and the time required for writing data into the image memory unit is t2 (t2 =nt1, where "n" is an arbitrary integer). The image memory unit is constituted by n block memories, and one double buffer memory and one timing control means are disposed for each block memory. In this case, data may be supplied from the double buffer memories to the corresponding block memories without interrupting the arithmetic operation of the DDA. This enables data to be written into the image memory unit at a high speed.

In other words, when pixel data continuous in the scanning line direction are successively generated by the DDA, a predetermined number of pixel data are successively supplied to the double buffer memory concerned. When a predetermined number of pixel data have been supplied to one plane of this double buffer memory, this double buffer memory is switched in plane and a predetermined number of pixel data may be supplied to the other plane of this double buffer memory.

While pixel data are being supplied to one plane of a double buffer memory, a predetermined number of pixel data may be collectively supplied from the other plane of the same double buffer memory to the block memory concerned. This enables data to be continuously written into the image memory unit while the DDA is continuously being operated at all times.

Where pixel data continuous in a direction inclined with respect to the scanning line are successively generated by the DDA, pixel data on the same scanning line may be supplied to the double buffer memory for this scanning line in the same manner as above-mentioned. Pixel data on a scanning line different from the previous scanning line may be supplied to the different double buffer memory concerned. For each change in scanning line, there is selected a different double buffer memory concerned. Accordingly, the scanning line on which data are to be generated, is changed n times before the first-selected double buffer memory is again selected. Until then, data writing to the image memory unit can be completed. Thus, a series of operations above-mentioned may be repeated without interrupting the arithmetic operation of the DDA.

To achieve the further object of the present invention, the texture mapping apparatus in accordance with the present invention comprises:

source data temporarily holding means for holding source data on a source vector (This vector is a line segment. Data thereof are read out for mapping.) read out according to texture plane coordinate data successively supplied, with the address data of the source data temporarily holding means successively varying synchronously with the texture plane coordinate data; and source data supplying means for reading, in the storage order, the source data held by the source data temporarily holding means, synchronously with an operation for generating display plane coordinate data on a destination vector (This vector is a line segment for display.) corresponding to the source vector, and for supplying the source data thus read out to the destination data holding means.

The destination data holding means is constituted by a plurality of block memories. The source data supplying means has a plurality of double buffer memories, and a plurality of timing control means, each of the double buffer memories and each of the timing control means being disposed for each of the block memories. The timing control means are adapted to receive the display plane coordinate data, to decode the contents of predetermined digits of the display plane coordinate data thus received, and to generate decode signals, based on which there are generated control signals by which pixel data are written through the double buffer memories concerned.

Preferably, the source data holding means and the destination data holding means are alloted to the same image memory unit.

The source data holding means is preferably constituted by a plurality of block memories. For the block memories, there are preferably disposed:

a plurality of writing double buffer memories;

a plurality of reading double buffer memories;

a plurality of timing control means adapted to receive the texture plane coordinate data, to decode the contents of predetermined digits of the texture plane coordinate data thus received, and to generate decode signals, based on which there are generated control signals by which pixel data are written through the writing double buffer memories concerned; and a plurality of delay means for supplying the texture plane coordinate data to the reading double buffer memories concerned with a predetermined period of time delayed, each writing double buffer memory, each reading double buffer memory, each timing control means and each delay means being disposed for each block memory.

Each delay means may be formed by a First-In First-Out memory (hereinafter referred to as a FIFO memory) and a decoder. Alternately, each delay means may be formed by a decoder and a linear interpolation operation unit for generating texture plane coordinate data at timing delayed by a predetermined period of time.

The source data temporarily holding means may be a SRAM, or a FIFO memory.

Preferably, the timing control means are adapted to decode the contents of predetermined digits of coordinate data in the scanning line direction, thereby to generate control signals based on which the double buffer memories concerned are switched in plane, and also to decode the contents of predetermined digits of coordinate data in a direction at right angle to the scanning line direction, thereby to generate control signals based on which the double buffer memories concerned are selected.

Preferably, the timing control means are adapted to generate control signals in timing of change in the contents of predetermined digits of the coordinate data.

As to the coordinate data in the scanning line direction, the timing control means are preferably adapted to generate control signals in timing of change in the contents of predetermined digits defined by the capacity of the double buffer memories. As to the coordinate data in a direction at right angle to the scanning line direction, the timing control means are preferably adapted to generate control signals in timing of change in the contents of the least significant digits of the coordinate data.

Preferably, timing control means are adapted to also receive drawing completion signals supplied from the DDA and to generate control signals based on which the double buffer memories concerned are switched in a plane.

Preferably, the image memory unit is constituted by a plurality of block memories each having a predetermined storage capacity, and each of the block memories is divided into two portions to which different image data are respectively stored. More preferably, each block memory is a dual-port DRAM.

According to the texture mapping apparatus having the arrangement above-mentioned, the texture mapping processing may be executed as follows.

Source data are read out by supplying texture plane coordinate data to the source data holding means which holds image information to be projected. According to display plane coordinate data supplied, the source data are supplied to the destination data holding means which holds image information to be displayed. In this case, by supplying the texture plane coordinate data to the source data holding means, color data of the pixels on the source vector are successively read out from the source data holding means. The color data thus read out are successively stored in the source data temporarily holding means, with the address data of the source data temporarily holding means varying synchronously with the texture plane coordinate data. Synchronously with the operation for generating display plane coordinate data on the destination vector corresponding to the source vector, the source data supplying means reads out, in the storage order, the color data held in the source data temporarily holding means. The color data thus read out are then supplied to the destination data holding means. At this time, the color data successively read out from the source data temporarily holding means may be immediately held in the buffer memories concerned because of the arrangement outlined below.

That is, the destination data holding means is constituted by a plurality of block memories. The source data supplying means has a plurality of double buffer memories, and a plurality of timing control means, each of the double buffer memories and each of the timing control means being disposed for each of the block memories. The timing control means are adapted to receive the display plane coordinate data, to decode the contents of predetermined digits of the display plane coordinate data thus received, and to generate decode signals, based on which there are generated control signals by which pixel data are written through the double buffer memories concerned.

Then, the data held in the double buffer memories may be successively supplied to the block memories concerned. Thus, the color data may be supplied at all times without interrupting the operation for generating the color data storing addresses.

Further, the pixel data generated may be temporarily held in the buffer memories, and then successively written into the image memory unit. This results in improvement in general texture mapping speed.

In generation of data reading addresses by the DDA, it is also possible to continuously read out data from the image memory unit while the DDA is continuously being operated.

DETAILED DESCRIPTION OF THE PREFERRED EMBODIMENTS

Figure 1:
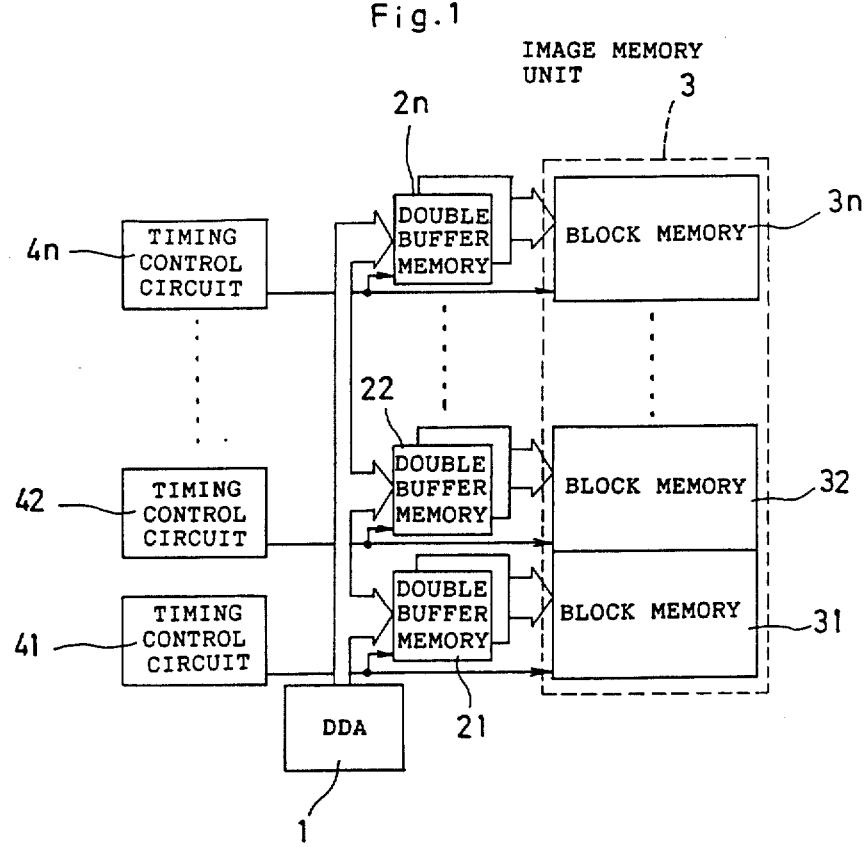
FIG. 1 is a block diagram of an embodiment of an image memory write control apparatus in accordance with the present invention.

FIG. 1 is a block diagram of an embodiment of an image memory write control apparatus in accordance with the present invention.

In this apparatus, pixel data supplied from a DDA 1 are supplied to a plurality of double buffer memories 21, 22,...2n, from each of which data are supplied to each of a plurality of block memories 31, 32, 3n constituting an image memory unit 3. Also disposed are timing control circuits 41, 42,.... 4n which receive address data supplied from the DDA 1, carry out a predetermined decoding operation and supply write control signals to the corresponding double buffer memories and to the corresponding block memories.

Upon reception of the address data supplied from the DDA 1, the timing control circuits 41, 42,... 4n decode the address data in the scanning line direction (hereinafter referred to as x-coordinate data) and the address data in a direction at a right angle to the scanning line direction (hereinafter referred to as y-coordinate data). Each of the timing control circuits 41, 42, ... 4n generates a decode signal determined by the contents of a predetermined digit of each of the x-coordinate data (the contents of a digit located in an upper position, from the least significant digit, by a predetermined number of digits to be defined by the capacity of each double buffer memory). Based on the decode signal, each of the timing control circuits 41, 42,... 4n generates a double buffer memory switching control signal and a block memory data write control signal.

Each of the timing control circuits 41, 42,... 4n also generates a decode signal determined by the contents of the least significant digit of each of the y-coordinate data. Based on the decode signal, each of the timing control circuits 41, 42,... 4n generates a double buffer memory selection control signal, a double buffer memory switching signal, and a block memory data write control signal. Based on a decode signal deter mined by a line segment drawing completion signal (signal representing that the contents of the DDA 1 control counter become zero), each of the timing control circuits 41, 42,... 4n generates a double buffer memory switching control signal.

Each of the block memories 31, 32,...3n has a dual plane arrangement, thus enabling to display one image, while another image data are being written.

The following description will discuss the operation of the image data write control apparatus having the arrangement above-mentioned.

When pixel data continuous in the scanning line direction are successively generated by the DDA 1, only one timing control circuit generates a write control signal. Each time a predetermined number of pixel data are generated, one plane of a double buffer memory is switched to the other plane of the same double buffer memory. While pixel data generated by the DDA 1 are being supplied to one plane of the double buffer memory, a plurality of pixel data are collectively written into the block memory concerned by the other plane of the same double buffer memory. Accordingly, this enables to collectively write a predetermined number of pixel data into the image memory unit 3 without interrupting the arithmetic operation of the DDA 1. Therefore, the time calculated for writing one-pixel data may be made equal to the time required for operating one-pixel data by the DDA 1.

When pixel data on the same scanning line are successively generated in a state where pixel data continuous in a direction inclined at a predetermined angle with respect to the scanning line direction are successively generated by the DDA 1, the timing control circuit concerned generates a write control signal and supplies the pixel data to the double buffer memory concerned. The pixel data are then written from the double buffer memory to the block memory concerned. When pixel data on the next scanning line are generated, the timing control circuit concerned generates a write control signal and supplies the pixel data to the double buffer memory concerned. The pixel data are then written from the double buffer memory to the block memory concerned.

Afterwards, the timing control circuit to generate a write control signal is shifted with each variation of the scanning line on which pixel data are to be generated. Thus, pixel data continuous in each direction inclined at a predetermined angle with respect to the scanning line direction, may be written into the image memory unit.

More specifically, the number of pixel data supplied to each double buffer memory is generally less than the limit determined by the capacity of each double buffer memory. If the time interval from supplying pixel data to a double buffer memory to supplying pixel data to the same double buffer memory again, is set to a period of time equal to or greater than the time required for writing the pixel data from the same double buffer memory to the block memory concerned, it is possible to write the pixel data held in the double buffer memory into the image memory unit 3 without any interruption of the arithmetic operation of the DDA 1. Consequently, the time calculated for writing one-pixel data may be made equal to the time required for operating one-pixel data by the DDA 1.

When one image data have been written in the manner above-mentioned, the image data may be read out and displayed by the image memory plane concerned. During image display, the next image data may be written into the other image memory plane.

It is noted that the image memory unit 3 may have a single plane arrangement. In this case, however, the image display and the image data writing cannot be simultaneously made. This requires to interrupt the arithmetic operation of the DDA 1 during image display. However, during image data writing, pixel data held in the double buffer memories may be written into the image memory unit 3 without any interruption of the arithmetic operation of the DDA 1.

Figure 3:
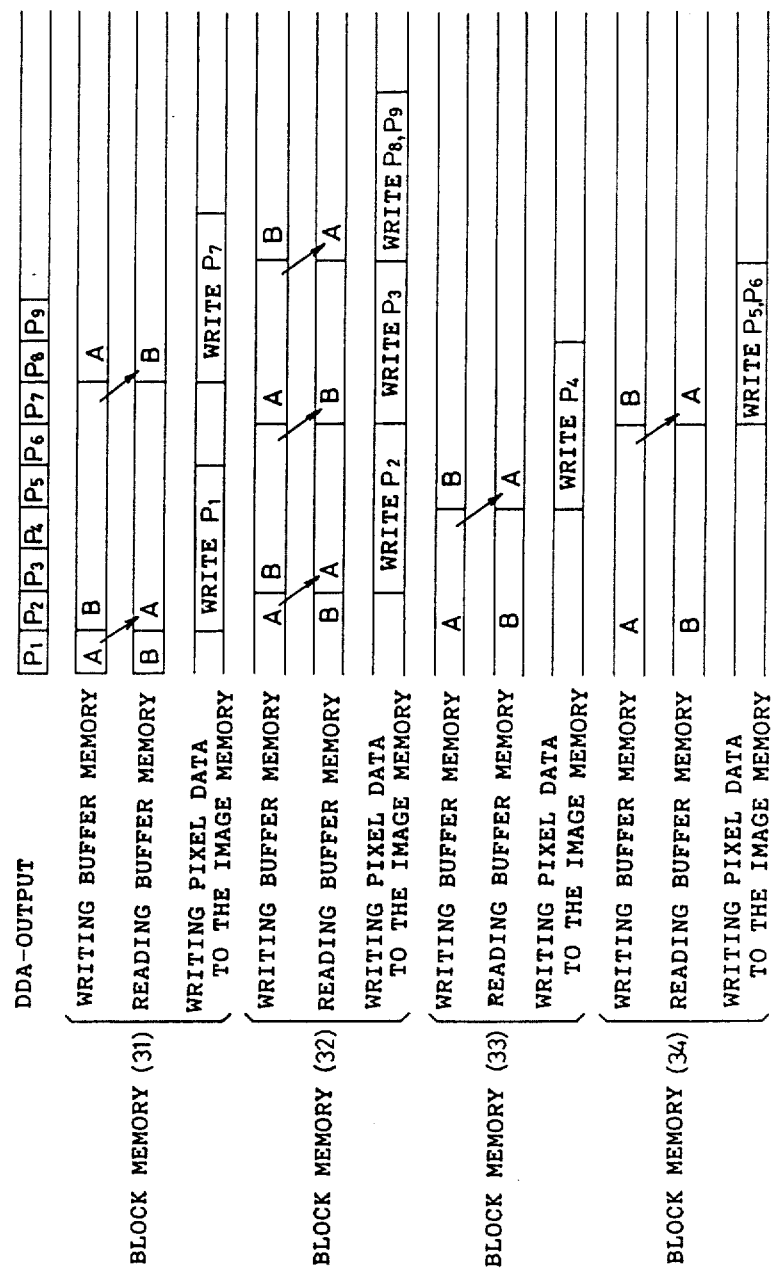
FIG. 3 illustrates the data writing operation to be made when an image memory unit is divided into four block memories.

FIG. 3 is a view illustrating the data writing operation to be made when the image memory unit 3 is divided into four block memories 31, 32, 33, 34.

Figure 2:
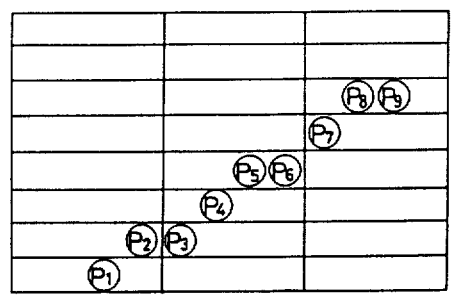
FIG. 2 illustrates an example of pixel data which are successively generated by a DDA.

In FIG. 3, the data writing operation is made for pixel data P1 to P9 successively generated by the DDA 1 shown in FIG. 2. In FIG. 2, the horizontal lines represent the scanning lines, while the vertical lines represent boundaries for pixels which can be stored in one double buffer memory (hereinafter referred to as bit boundaries).

When the pixel data P1 are generated by the DDA 1, the pixel data P1 are supplied to one plane (hereinafter referred to as the A-plane) of the double buffer memory 21. Then, the pixel data P2 are generated. Since the scanning line has been shifted, the pixel data P2 are supplied to the A-plane of the double buffer memory 22 and the A-plane of the double buffer memory 21 is switched to serve as the data reading side. The data are written into the block memory 31. Then, the pixel data P3 are generated. The scanning line has not been shifted, but the bit boundary in the x-coordinate direction is exceeded. Accordingly, the pixel data P3 are supplied to the other plane (hereinafter referred to as the B-plane) of the double buffer memory 22, and the A-plane is switched to serve as the reading side. The data are then written into the block memory 32. Then, the pixel data P4 are generated. Since the scanning line has been changed, the pixel data P4 are supplied to the A-plane of the double buffer memory 23. Then, the pixel data P5, P6 are generated. Both pixel data are located on the same scanning line and do not exceed the bit boundary in the x-coordinate direction. Accordingly, the pixel data P5 and P6 are supplied to the A-plane of the double buffer memory 24 in the generation order. Then, the pixel data P7 are generated and supplied to the B-plane of the double buffer memory 21. At this point, data writing from the A-plane of the double buffer memory 22 to the block memory 32 is completed. Accordingly, the B-plane of the double buffer memory 22 is switched to serve as the reading side. The data are written into the block memory 32, and the A-plane of the double buffer memory 24 is switched to serve as the reading side. The data are then written into the block memory 34.

Thereafter, there may be carried out the entry of pixel data to the double buffer memories concerned and the writing of the pixel data held in the double buffer memories to the corresponding block memories, in the same manner as above-mentioned.

Figure 4:
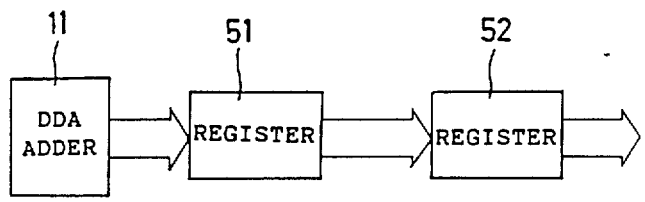
FIG. 4 is a schematic block diagram showing the DDA in the form of a pipeline.

To switch each double buffer memory plane, it is required to change the contents of a specific digit of address data supplied from the DDA 1. This change is made easily by arranging the DDA 1 in the form of a pipeline in which data supplied from a DDA adder 11 are successively supplied to registers 51, 52, as shown in FIG. 4. This will be described in more detail with reference to FIG. 5.

D-type flip-flops (hereinafter referred to as D-FF) are used as the registers 51, 52. The contents of the lth digit of data supplied from the DDA adder 11 may be supplied to a D-input terminal of the first-stage D-FF 51, and a Q-output signal may be supplied from the first-stage D-FF 51 to a D-input terminal of the second-stage D-FF 52, and a DDA clock signal may be supplied to timing input terminals of both D-FFs 51, 52. When the arrangement above-mentioned is used, there are obtained Q-output signals a1, b1, and $\overline{Q}$output signal $\overline{a}$, $\overline{b}$ from both D-FFs 51, 52. The signals b1 and $\overline{a}$ thus obtained are supplied to an AND gate 53, and the signals a1 and $\overline{b}$ are supplied to an AND gate 54. Output signals from both AND gates 53, 54 are supplied to a NOR gate 55. Thus, there is generated a detection flag for detecting a change in the contents of a specific digit.

Figure 6:
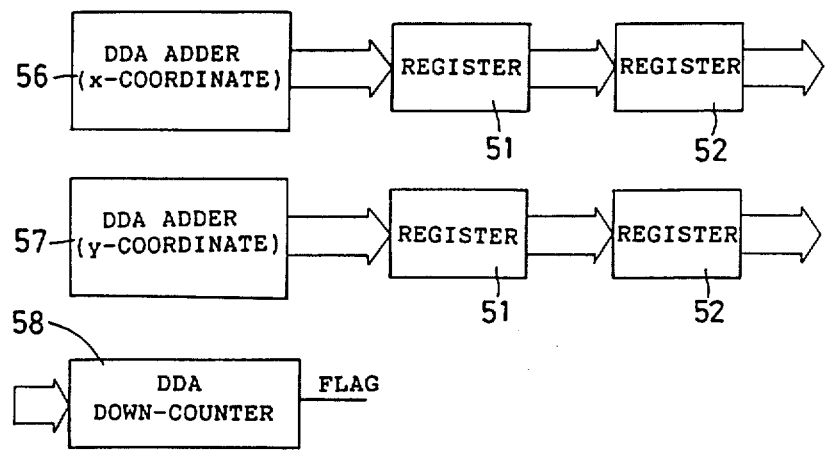
FIG. 6 is a schematic block diagram showing a pair of DDAs in the form of a pipeline.

FIG. 6 is a schematic block diagram in which, only when the lower digits of each y-coordinate data have predetermined contents, there are detected:

(i) a change in the contents of the least significant digit of each y-coordinate data;

(ii) a change in the contents of a digit located in an upper position by a predetermined number of digits from the least significant digit of each x-coordinate data; and (iii) the completion of line segment drawing.

Figure 7:
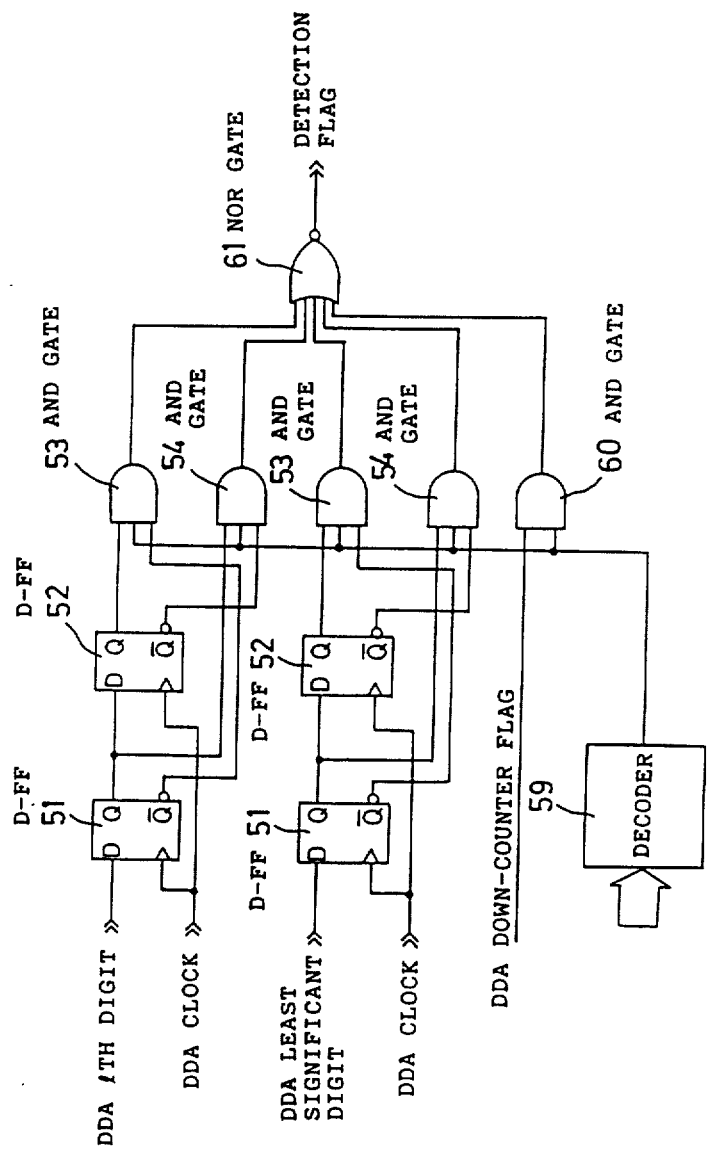
FIG. 7 is a detailed block diagram of another example of the circuit arrangement for detecting variations of the contents of a specific digit of address data.

FIG. 7 shows the detail of the block diagram in FIG. 6.

Figure 5:
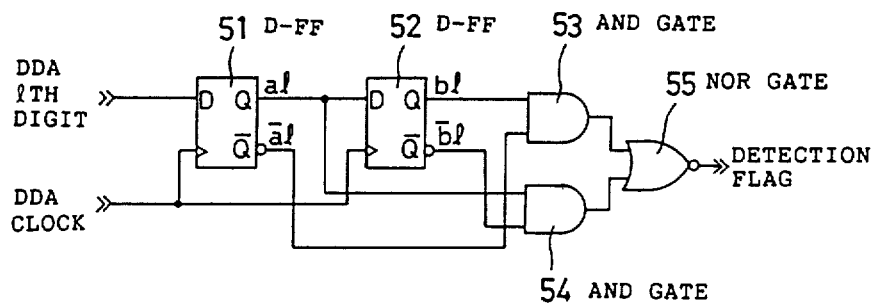
FIG. 5, is a detailed block diagram showing an example of a circuit arrangement for detecting variations of the contents of a specific digit of address data.

In FIGS. 6 and 7, data supplied from a DDA adder 56 for the x-coordinate and a DDA adder 57 for the y-coordinate are respectively supplied to circuits each having the same arrangement in FIG. 4 and FIG. 5. An AND gate 60 is adapted to receive:

(i) a flag from a DDA down-counter 58 (an overflow flag which becomes high when the contents of the downcounter 58 are zero); and (ii) a signal from a decoder 59 which becomes high when the contents of the lower digits of the y-coordinate data supplied from the DDA represent the block memory concerned.

The signal supplied from the decoder 59 is supplied to all the AND gates, and signals from all the AND gates are supplied to a NOR gate 61.

In the arrangement above-mentioned, when the output signal from the decoder 59 is in the high level, the NOR gate 61 supplies a double buffer memory switching timing detection flag in negative logic, according to the change in the contents of the least significant digit of the y-coordinate data, the change in the contents of a predetermined digit of the x-coordinate data and the completion of line segment drawing.

The decoder and AND-OR-INVERTER shown in FIG. 7 may be easily made in the form of PAL (Programable Alley Logic).

Figure 8:
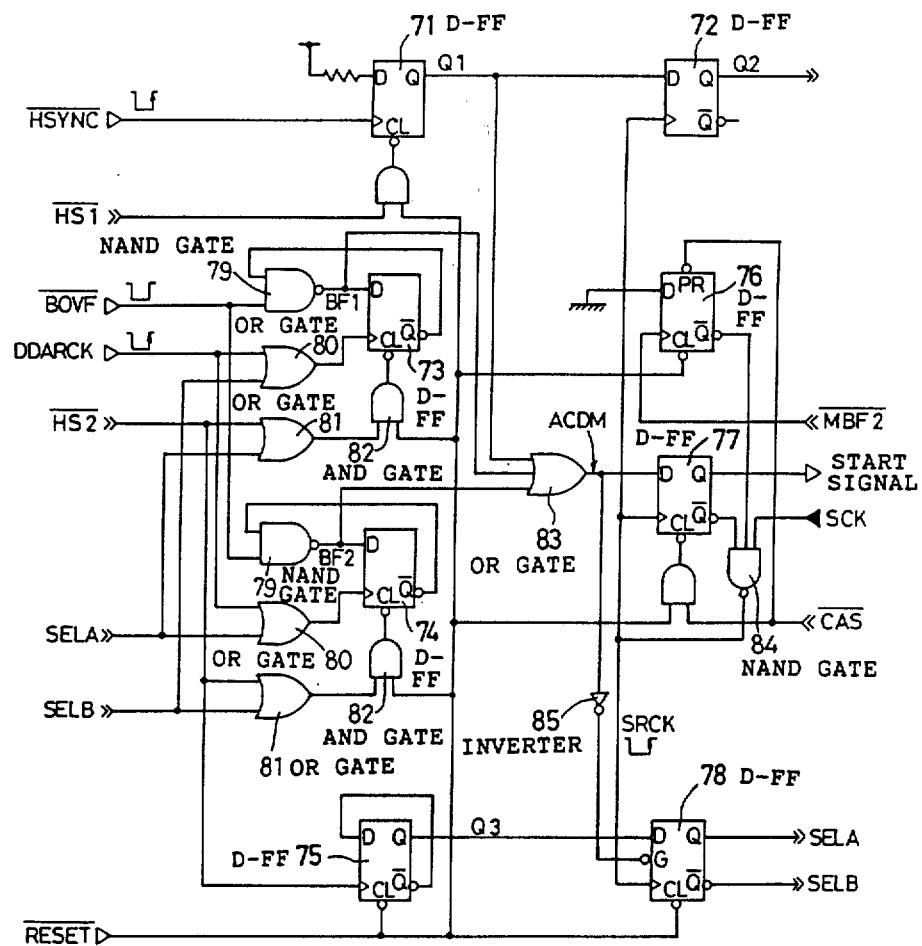
FIG. 8 is a view of a circuit arrangement for controlling the timing of a DRAM and switching a double buffer memory in a plane, based on a double buffer memory switching timing detection flag.

FIG. 8 shows a circuit arrangement for achieving the DRAM timing control and the double buffer memory switching without interrupting the DDA, based on the double buffer memory switching timing detection flag generated in the circuit arrangement shown in FIG. 7. In FIG. 8, eight D-FFs 71 to 78 are used.

Figure 9:
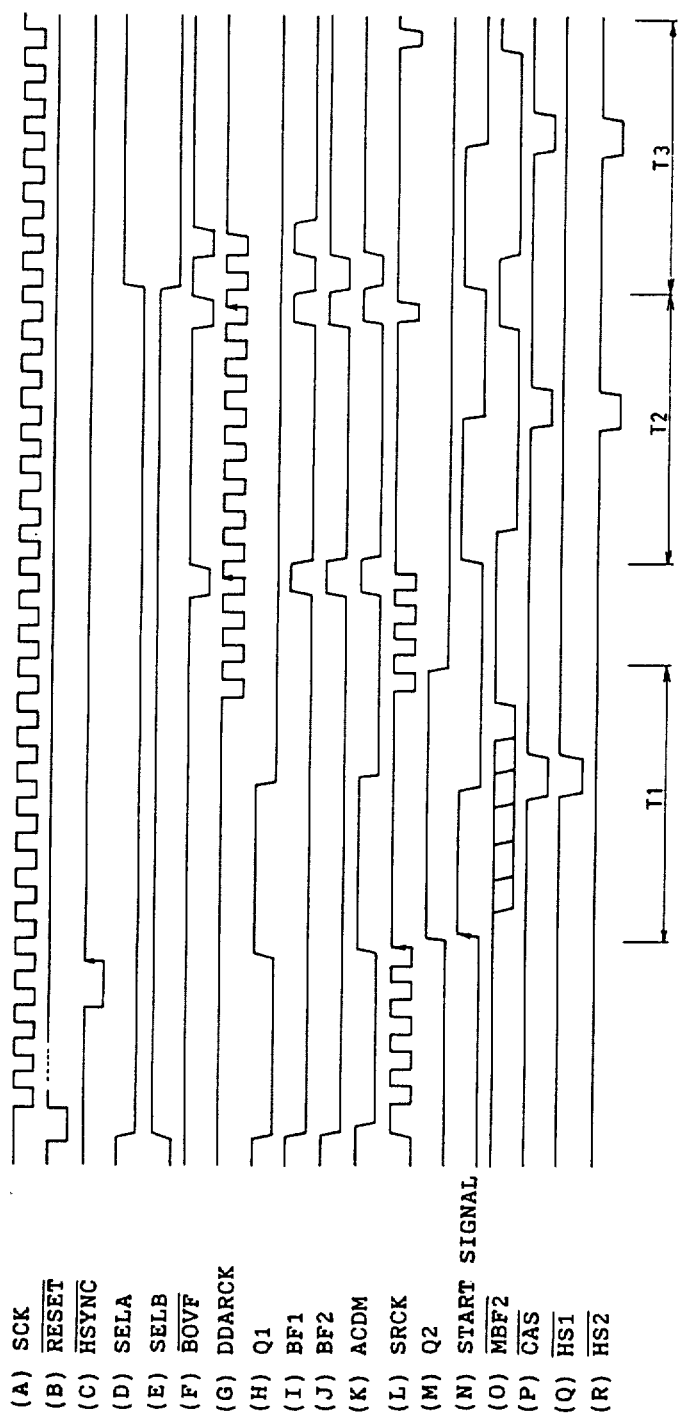
FIG. 9 is a timing diagram useful in understanding the operation of the circuit arrangement in FIG. 8.

The D-FF 71 receives:

(i) a horizontal synchronizing signal $\overline{HSYNC0}$ supplied from a CRT controller (not shown) (See FIG. 9 (C)), as a timing signal;and (ii) a hand shake signal $\overline{HS1}$ presenting whether or tive-logic hand shake signal $\overline{HS2}$ presenting that the memory write cycle has been accepted (See FIG. 9 (R)), through an OR gate 81 and an AND gate 82. For one D-FF, a Q-output signal SELA (See FIG. 9 (D)) and a $\overline{Q}$output signal SELB (See FIG. 9 (E)) both supplied from the D-FF 78 are respectively supplied to the OR gates 80 and 81. For the other D-FF, the Q-output signal SELA and the $\overline{Q}$output signal SELB both supplied from the D-FF 78 are respectively supplied to the OR gates 81 and 80.

Accordingly, the double buffer memory switching timing detection flag $\overline{BOVF0}$ is fetched, provided that there is selected, as a data holding flip-flop, the D-FF for which the Q-output signal SELA and the $\overline{Q}$output signal SELB in the low level are supplied to the OR gate 80, and that the DDA pixel strobe signal DDARCK rises. However, the double buffer memory switching timing detection flag $\overline{BOVF0}$ is supplied through the NAND gate 79 controlled by the $\overline{Q}$output signal [See signals BF1 and BF2 (FIG. 9 (I) and (J))]. Accordingly, the double buffer memory switching timing detection flag $\overline{BOVF0}$ is simultaneously supplied both to the D-input terminal and to an OR gate 83, to be discussed later, in timing at which a buffer memory full state is about to take place. The double buffer memory switching timing detection flag $\overline{BOVF0}$ is then held as it is.

The D-FF 75 is disposed for generating a Q-output signal Q3 for the next double buffer memory switching state. The D-FF 75 has a D-input terminal to which a $\overline{Q}$output signal is supplied, and a timing input terminal to which the negative-logic hand shake signal supplied.

The D-FFs 76, 77 are disposed for generating a sampling strobe signal SRCK which is synchronous with clock, without generating glitch. The D-FF 76 has a timing input terminal to which supplied is a negative-logic pulse signal $\overline{MBF2}$ (FIG. 9 (0)) presenting that the sequence is 2 clocks before the memory cycle is finished. The D-FF 76 also has a preset input terminal to which is supplied a negative-logic pulse signal $\overline{CAS0}$ that is always generated once in the memory cycle [for example, a DRAM column address strobe signal (See FIG. 9 (P))]. The D-FF 77 has a D-input terminal to which supplied are:

(i) the Q-output signal Q1 from the D-FF 71; and (ii) signals from the NAND gates 79 for the D-FFs 73, 74, through the OR gate 83.

A NAND gate 84 receives $\overline{Q}$output signals of the D-FFs 76, 77, and a sampling clock signal SCK (See FIG. 9 (A)). In turn, the NAND gate 84 supplies a sampling strobe signal SRCK. The signal SRCK is also supplied to the timing input terminal of the D-FF 77. The negative-logic pulse signal $\overline{CAS0}$ is supplied to a clear input terminal of the D-FF 77. The Q-output signal of the D-FF 77 is supplied as a start signal (See FIG. 9 (N)) of which rise represents the start of the memory cycle.

The D-FF 78 is disposed for supplying the double buffer memory switching signals SELA, SELB as Q-output signal and $\overline{Q}$output signal, respectively. The D-FF 78 has a D-input terminal to which the Q-output signal Q3 of the D-FF 75 is supplied, and a timing input terminal to which the sampling strobe signal SRCK is supplied. The D-FF 78 has also a G-input terminal to which an output signal ACDM (See FIG. 9 (K)) from the OR gate 83 is supplied through an inverter 85.

Accordingly, the Q-output signal from the D-FF 75 is held at the timing that the signal supplied to the G-input terminal is low and that the sampling strobe signal SRCK rises. According to the level of this Q-output signal, the D-FF 78 continuously supplies the Q-output signal SELA and the $\overline{Q}$output signal SELB of which levels are opposite to each other.

A negative-logic initialization signal $\overline{RESET0}$ (See FIG. 9 (B)) is supplied to each of the clear input terminals of the D-FF 71 to 78.

The following description will discuss the operation image data write operation in periods of time T2, T3.

Accordingly, when the timing control circuit having the arrangement shown in FIGS. 7 and 8 is disposed for each block memory, it is possible to successively carry out an operation of writing generated pixel data into the image memory unit 3, without interrupting the arithmetic operation of the DDA 1. That is, data of any line segment without any influence by the inclination thereof, may be written into the image memory unit 3 in a period of time equal to that required for arithmetic operation of the DDA 1, when consideration is made of one-pixel data.

To obtain an image memory unit for 2048×1024 pixels in a graphic display apparatus, eight 256K-bit DRAMs are used to form one image memory unit which stores pixel data for one screen. Also used are double buffer memories, each of which includes two 1×8-bit planes. The image memory unit has a dual-plane arrangement including a plane for storing pixel data under display, and a plane for writing pixel data to be next displayed. Each plane is constituted by eight 256K-bit DRAMs.

When the dual-plane arrangement above-mentioned is employed, it is not possible to divide the image memory unit into eight block memories for each plane, and to dispose a double buffer memory and a timing control circuit for each block memory. This is because the block memories have a small input bit width in their entirety. That is, the input bit width of a 256K-bit DRAM is set to four bits. The entire block memories have an input bit width as small as 32 bits.

However, when eight 1x8-bit double buffer memories are disposed, the entire double buffer memories have a 64-bit width. This fails to assure a 1:1 correspondence between the block memories and the double buffer memories in bit width. To obtain the 1:1 correspondence, 16 DRAMs are required for one plane, resulting in provision of excessive memories.

Figure 10:
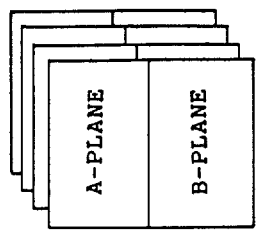
FIG. 10 illustrates the plane arrangement of the image memory unit.

To overcome the problem above-mentioned and to assure the dual-plane arrangement in the image memory unit with a sufficient input bit width provided, there may be employed an arrangement as shown in FIG. 10. In this arrangement, plane division is not made per DRAM, but is made in each DRAM, and control is made to which plane acess is to be made, based on the contents of the most significant bit of row address data supplied to each DRAM.

Figure 11:
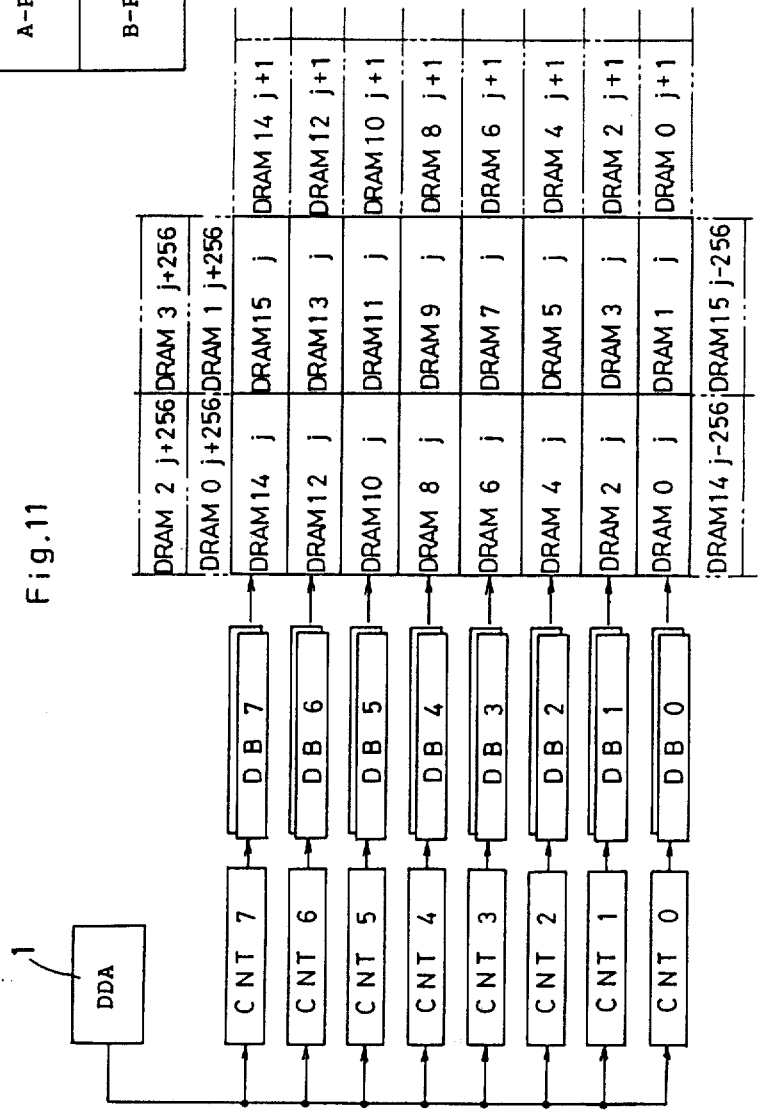
FIG. 11 is useful in understanding the relationship among the image memory unit in FIG. 10, double buffer memories and timing control circuits.

FIG. 11 is a view illustrating the detail of the arrangement in FIG. 10.

In FIG. 11, there are disposed timing control circuits CNT 0 to CNT 7, and double buffer memories DB0 to DB7, each double buffer memory being disposed for each timing control circuit. Also disposed are 16 DRAMs from DRAM 0 to DRAM 15, each of which is disposed for each plane of each double buffer memory. Each DRAM is divided into portions .. DRAM j−2, DRAM j−1, DRAM j, DRAM j+1, DRAM j+2... (where "j" is an arbitrary integer). Each pair of DRAMs on the odd and even numbers are disposed for each double buffer memory and for each timing control circuit. Based on the upper address data of the x-coordinate and the y-coordinate supplied from the DDA 1, the timing control circuits hold address data ... "j−2", "j−1", "j", "j+1", "j+2"... of the DRAMs into which pixel data supplied to the double buffer memories, are to be written. Based on the contents of the most significant bit of the row address data supplied to the each DRAM, the timing control circuit concerned holds plane selecting data.

Accordingly, in this arrangement likewise in the embodiment mentioned earlier, pixel data from the DDA 1 may be supplied to one plane of a double buffer memory and the pixel data held in the other plane of the same double buffer memory may be collectively written into the DRAM concerned, provided that the contents of the least significant digit of the y-coordinate data are changed, or that the contents of the lower 4th digit of the x-coordinate data are changed, or that the line segment drawing is completed. As a whole, the time calculated for writing one-pixel data to each DRAM is made equal to the time required for the arithmetic operation of one-pixel data by the DDA 1.

Accordingly, the operation of generating pixel data and the operation of writing the pixel data thus generated to the DRAMs may be carried out without interrupting the arithmetic operation of the DDA 1, except for the DRAM refresh operation and the operation of reading out pixel data to be displayed from the DRAMs. Since the DRAM refresh operation is previously determined, it is possible to know it beforehand. In this connection, it is sufficient to previously set such that a DDA control clock is given at a greater interval for such DRAM refresh operation. A hand shake for identifying the period of time for the refresh operation may be eliminated, thereby to further shorten the time required for writing data into the image memory unit.

In the embodiment above-mentioned, when a dual port DRAM is used as the DRAM, the time required for reading data to be displayed may be considerably shortened. This allows 98% of the entire processing time to be used for data writing. As a whole, the time required for writing data into the image memory unit may be shortened.

It is apparent that the image memory write control apparatus in accordance with the present invention should not be limited to the embodiments above-mentioned.

For example, 2×8-bit buffer memories may be used as the double buffer memories. It is also possible to change the storage capacity of each DRAM itself, the number of DRAMs, the storage capacity of each double buffer memory itself, the number of double buffer memories, and the number of timing control circuits, in accordance with the resolution required in a graphic display apparatus. Further, when DRAMs have a large input bit width, the DRAM inside may be divided into a plurality of block memories. In addition, various modifications and variations of the present invention may be made without departing from the spirit and principle of the present invention.

Figure 14:
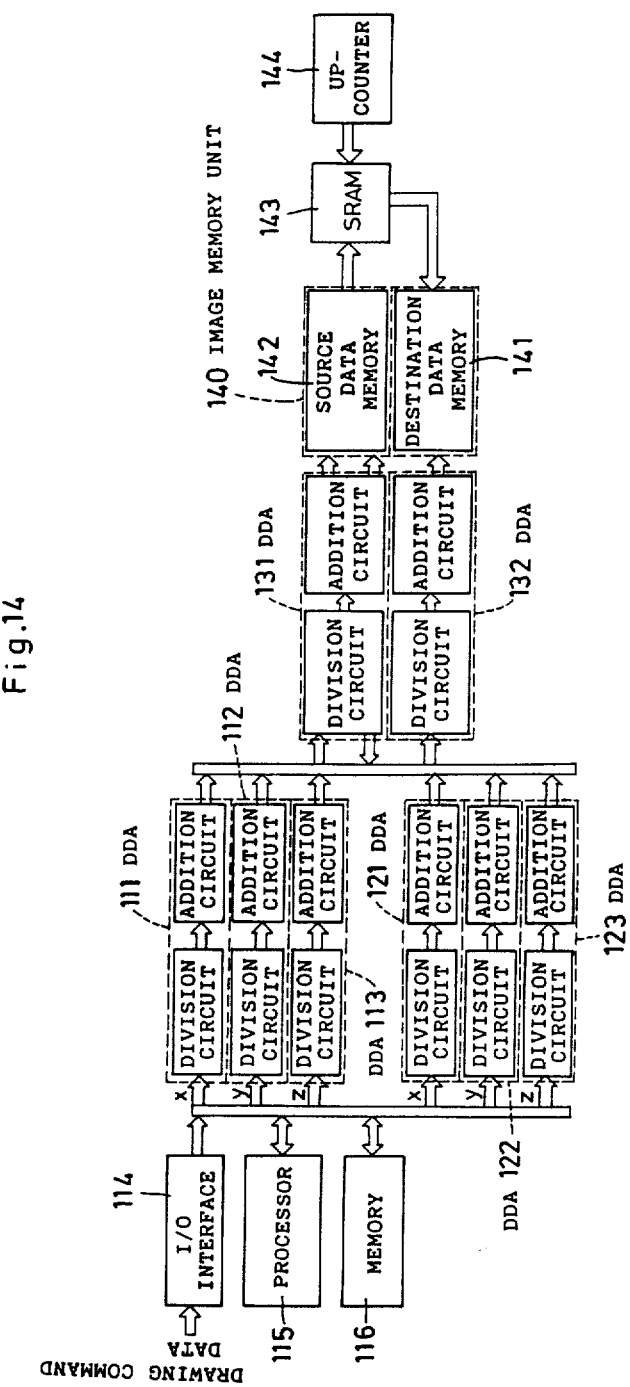
FIG. 14 is a block diagram of an embodiment of a texture mapping apparatus in accordance with the present invention.

FIG. 14 is a block diagram of an embodiment of texture mapping apparatus in accordance with the present invention. This apparatus comprises:

side interpolation DDAs 111, 112, 113, 121, 122, 123 for the x- and y-values of two sides (two dimensional coordinate data on the display plane, or two dimensional coordinate data on the texture plane) and for the z-values (depth coordinate data on the display plane) of the two sides above-mentioned;

a line segment interpolation DDA 131 for receiving the x- and y-values supplied from the DDAs 111, 112, 121, 122;

a line segment interpolation DDA 132 for receiving the z-values supplied from the DDAs 113, 123;

a source data memory 142 for receiving the x- and y-values supplied from the DDA 131 as data reading addresses;

a SRAM 143 for successively storing color data read out by the source data memory 142;

an up-counter 144 for supplying, to the SRAM 143, address data successively incremented synchronously with the supply of the data reading addresses;

a z-buffer (not shown) for receiving the z-values above-mentioned to execute a z-sort processing, thereby to generate z-flags; and a destination data memory 141 for receiving the x- and y-values above-mentioned as data writing addresses such that the color data read out from the SRAM 143 are written into the addresses concerned.

The destination data memory 141 and the source data memory 142 are respectively alloted to different address spaces in the same image memory unit 140. Each of the DDAs includes division circuits and addition circuits.

An I/0 interface 114 is disposed for fetching drawing command data supplied from a host processor (not shown). There are also disposed a processor 115 for executing a side selection processing or the like, and a memory 116.

Figure 13:
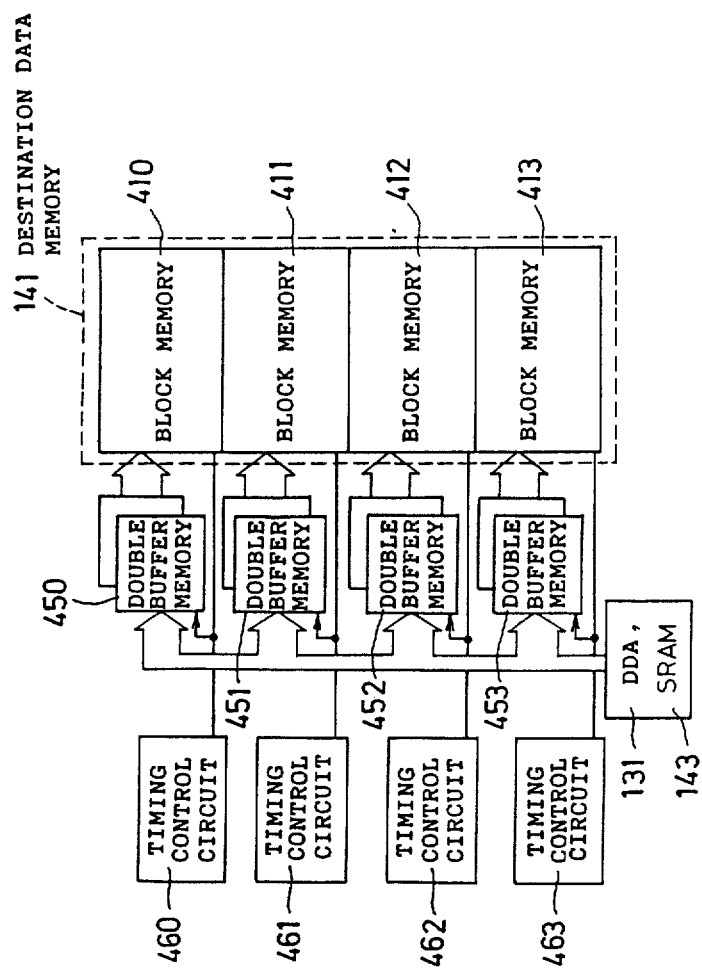
FIG. 13 is a block diagram showing an arrangement for writing color data to a destination data memory.

FIG. 13 is a block diagram for writing color data into the destination data memory 141. The destination data memory 141 is divided into four block memories 410, 411, 412, 413. These block memories 410 to 413 receive the x- and y-values supplied from the DDA 131 and the color data read out by the SRAM 143 through respective double buffer memories 450, 451, 452, 453.

Timing control circuits 460, 461, 462, 463 are respectively disposed for the block memories and double buffer memories. The timing control circuits 460 to 463 decode the x- and y-values supplied from the DDA 131 and generate double buffer switching signals or double buffer selection signals and block memory selection signals.

More specifically, the timing control circuits receive address data supplied from the DDA 131, and decode the x- and y-values. Each of the timing control circuits 460 to 463 generates a decode signal determined by the contents of a predetermined digit of the x-value data (the contents of a digit located in an upper position, from the least significant digit, by a predetermined number of digits to be defined by the capacity of each double buffer memory). Based on the decode signal, each timing control circuit generates a double buffer memory switching control signal and a block memory data write control signal. Each of the timing control circuits 460 to 463 generates a decode signal determined by the contents of the least significant digit of y-coordinate data. Based on the decode signal, each timing control circuit generates a double buffer memory selection control signal, a double buffer memory switching control signal, and a block memory data write control signal. Based on a decode signal determined by a line segment drawing completion signal (representing that the contents of the control counter of the DDA 131 become zero), each timing control circuit generates a double buffer memory switching control signal. The image memory unit 140 has a dual-plane arrangement in which data for one image are written while data for another image are being displayed.

The following description will discuss the operation of the texture mapping apparatus having the arrangement above-mentioned.

Figure 12:
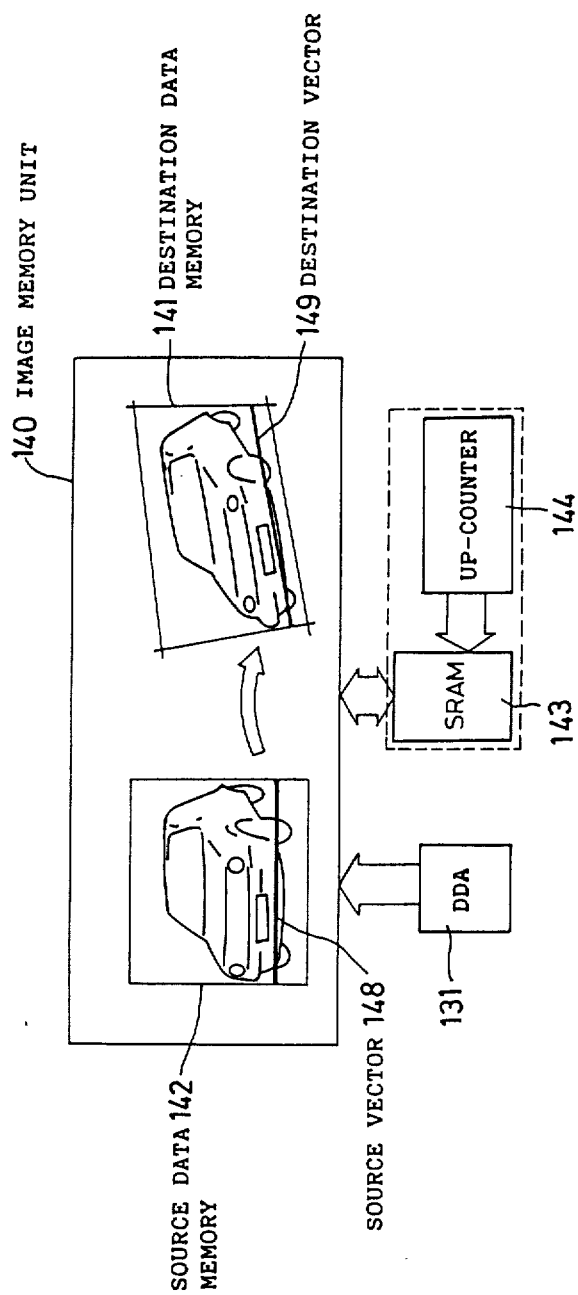
FIG. 12 illustrates a mapping operation.

FIG. 12 is a view schematically illustrating the mapping operation. The source data memory 142 and the destination data memory 141 are alloted to the image memory unit 140.

First, the x- and y-values for the source data memory 142 are successively generated and supplied, as data reading addresses, from the DDA 131. The color data on a source vector 148 are successively read out. The source vector 148 is a line segment. Data thereof are read out for mapping. The color data thus read out are successively written into the SRAM 143 in which the writing addresses are designated by the up-counter 144 of which contents are successively incremented synchronously with the generation of the x- and y-values above-mentioned.

Then, the x- and y-values for the destination data memory 141 are successively generated and supplied, as data writing addresses, from the DDA 131. Color data read out in the writing order by the SRAM 143 are written into a destination vector 149. The destination vector 149 is a line segment for display. A mapping operation is then carried out.

That is, the mapping operation is carried out in such manner that the color data on the source vector 148 are successively read out by the source data memory 142 alloted to the image memory unit 140 and are temporarily held in the SRAM 143, and the color data are then read out by the SRAM 143 in the storing order and written into the destination vector 149 of the destination data memory 141.

In the series of operations above-mentioned, the color data on the source vector 148 may be stored in the SRAM 148 in a short period of time because access to the SRAM is made at a high speed. On the other hand, the color data read out from the SRAM 143 may be written into the destination data memory 141 in a short period of time. That is, the destination data memory 141 is divided into four block memories, for each of which one double buffer memory and one timing control circuit are disposed. Accordingly, such writing may be made in a short period of time when consideration is made on the time required for writing one-pixel data. Thus, the time required for entire texture mapping operation may be considerably improved.

More specifically, when address data continuous in the x-coordinate direction are successively generated by the DDA 131, only one timing control circuit generates a write control signal. Each time a predetermined number of pixel data are generated, the double buffer memory concerned is switched. While the color data read out by the SRAM 143 being supplied to one plane of the double buffer memory, a plurality of color data are collectively written into the block memory concerned by the other plane of the same double buffer memory. Accordingly, this enables collective writing of a predetermined number of color data into the destination data memory 141 without interrupting the arithmetic operation of the DDA 131.

When address data on the same scanning line are successively generated in a state where address data continuous in a direction inclined at a predetermined angle with respect to the scanning line direction are successively generated by the DDA 131, one timing control circuit concerned generates a write control signal, based on which the color data may be supplied to the double buffer memory concerned and then written from the double buffer memory to the block memory concerned. When address data on the next scanning line are generated, the timing control circuit concerned generates a write control signal, based on which the color data may be supplied to the double buffer memory concerned and then written from the double buffer memory to the block memory concerned.

Afterwards, the timing control circuit to generate a write control signal is shifted with each variation of the scanning line on which address data to be generated are located. Thus, color data continuous in each direction inclined at a predetermined angle with respect to the scanning line direction may be successively written into the destination data memory 141.

Accordingly, even though the time required for writing data into the image memory unit 140 is long, the time calculated for writing data for one pixel may be made substantially equal to the time required for arithmetic operation for one-pixel data by the DDA 131. Thus, the mapping speed may be considerably improved.

When the mapping operation has been made for one image in the manner above-mentioned, the image data may be read out from the destination data memory plane concerned and then displayed. During image display, the next image data may be written into the other memory plane.

Figure 15:
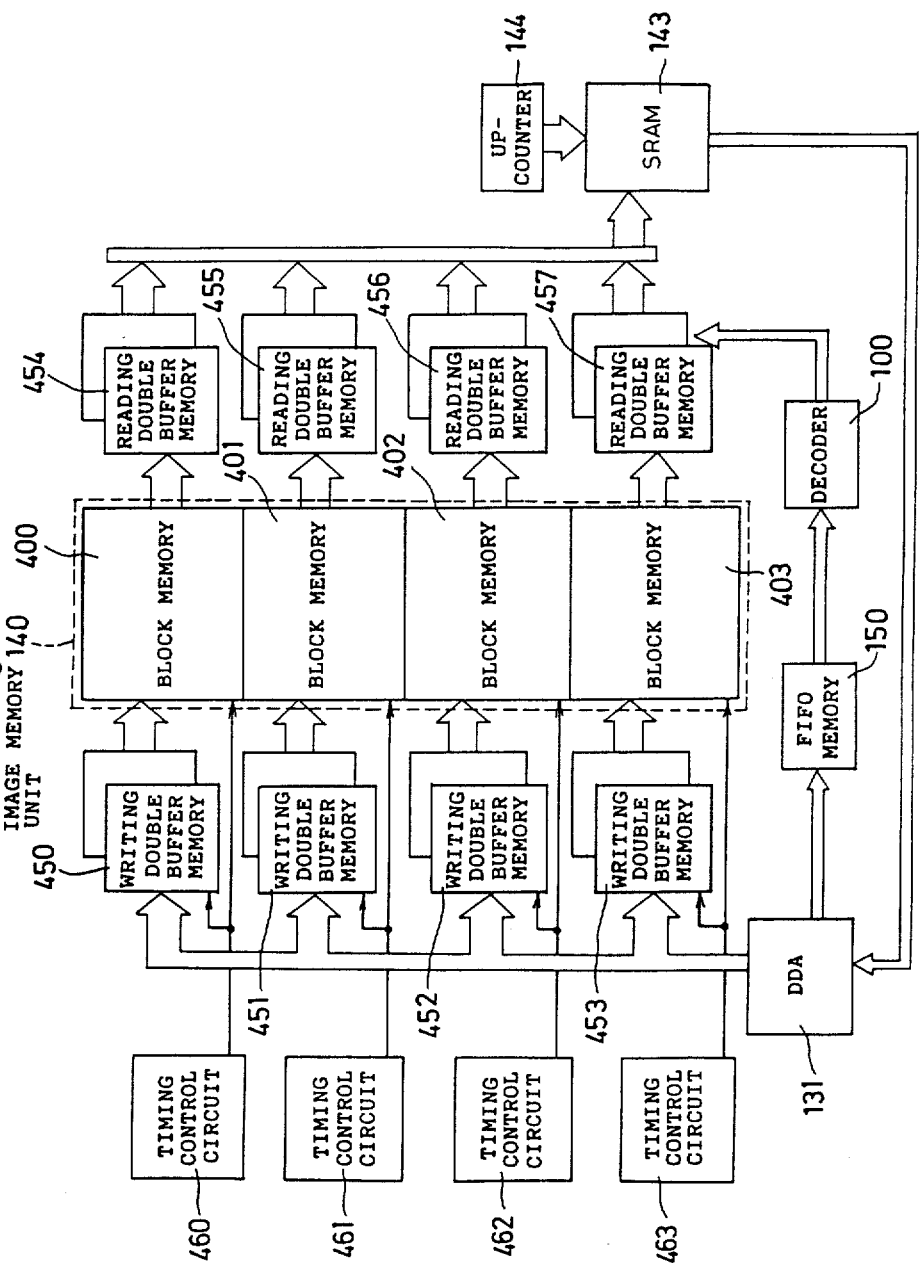
FIG. 15 is a block diagram showing an arrangement for also improving the speed at which color data on source vectors are read out from a source data memory.
Figure 16:
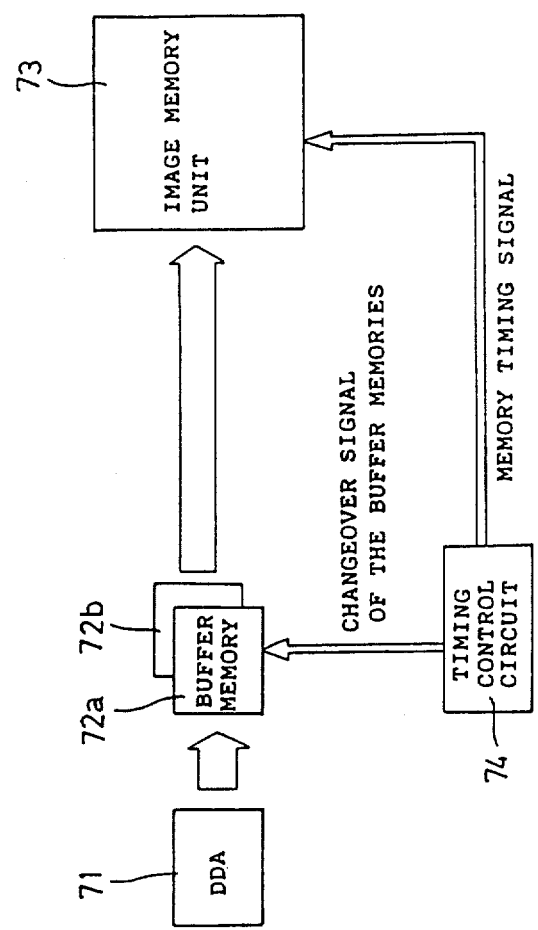
FIG. 16 is a schematic diagram useful in understanding a conventional double buffer method.
Figure 17:
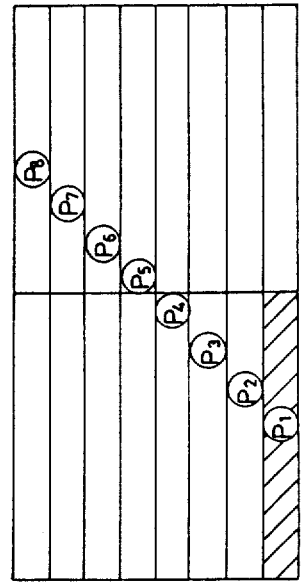
FIG. 17 and FIG. 18 illustrate the operation of a conventional 1x8 double buffer method.
Figure 18:
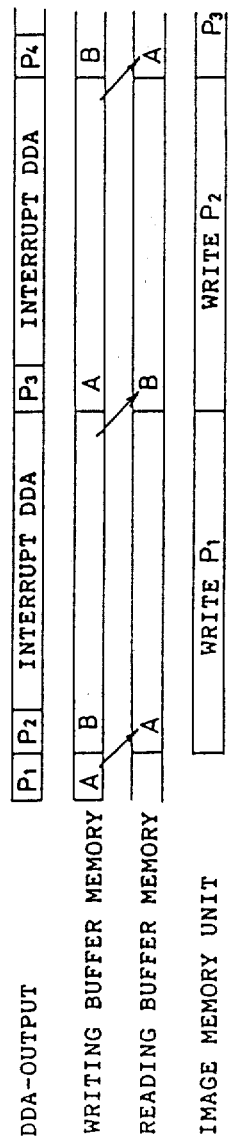
Figure 19:
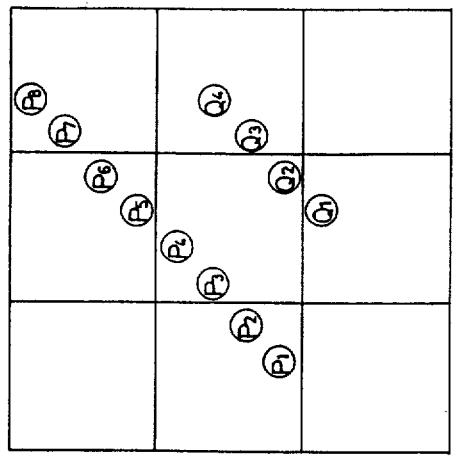
FIG. 19 and FIG. 20 illustrate the operation of a conventional 4x4 double buffer method.
Figure 20:
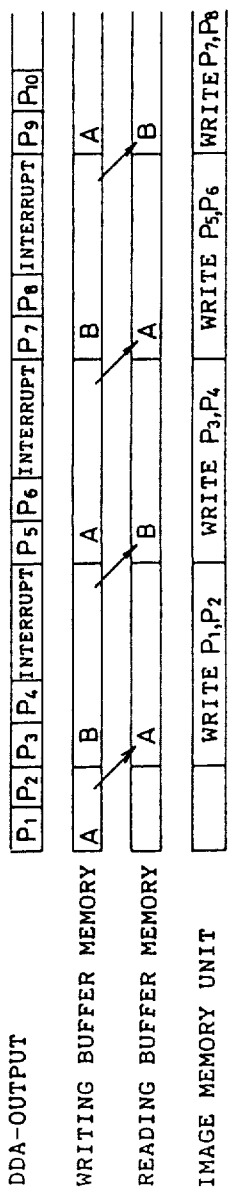

FIG. 15 is a block diagram of an arrangement for improving the speed at which the color data on the source vector 148 are read out from the source data memory 142.

In this arrangement, the image memory unit 140 is divided into four block memories 400, 401, 402, 403, for which there are disposed writing double buffer memories 450, 451, 452, 453, reading double buffer memories 454, 455, 456, 457 and timing control circuits 460, 461, 462, 463. The x- and y-values supplied from the DDA 131 are supplied, as they are, to the writing double buffer memories 450, 451, 452, 453. These x- and y-values are also supplied to a decoder 100 through a delay FIFO memory 150. Decoded data supplied from the decoder 100 are then supplied to the reading double buffer memories 454, 455, 456, 457. Color data read out through the reading double buffer memories 454, 455, 456, 457 are supplied to the SRAM 143 of which storing addresses are successively incremented by the up-counter 144. Together with the address data supplied from the DDA 131, data read out from the SRAM 143 are supplied to the writing double buffer memories 450, 451, 452, 453. The DDA 131 generates address data for writing or reading data to or from the image memory unit 140. When the DDA 131 generates the address data for data reading, the DDA 131 is inhibited from supplying data to be written.

Accordingly, in writing data to the image memory unit 140 divided into four block memories in the arrangement in FIG. 15, i.e., in writing the color data successively read out from the SRAM 143, the time calculated for such writing of one-pixel data may be made equal to the time required for arithmetic operation of the DDA 131, likewise in the arrangement in FIG. 13.

The arrangement shown in Figs. . 4 to 11 may be suitably applied in the texture mapping apparatus above-mentioned.

The texture mapping apparatus of the present invention should not be limited to the embodiment above-mentioned.

For example, a FIFO memory may be used instead of the SRAM 143. Instead of the delay FIFO memory 150, there may be used another DDA for generating address data in timing delayed by a predetermined period of time as compared with that in the DDA 131. Further, it is possible to change the number of double buffer memories, and the number of timing control circuits. The source data memory and the destination data memory may be individually alloted to different image memories. Provision may be also made such that other processing such as scaling and rotation is executed. In addition, the modifications and variations of the present invention may be made without departing from the scope and principle of the present invention.

What is claimed is:

1. An image memory write control apparatus for controlling writing of pixel data which is generated by a linear interpolation operation unit and which comprises image data and coordinate data including first coordinate data pertaining to a scanline direction of a display means and second coordinate data pertaining to a direction perpendicular to said scanline direction to an image memory unit which stores image data as output data for the display means, said apparatus comprising:

an image memory unit including a plurality of block memories;

a corresponding plurality of double buffer memories, each of said double buffer memories being selectable to receive pixel data from said linear interpolation operation unit in response to a selection control signal applied thereto, each of said double buffer memories being associated with one of said block memories and connecting its associated block memory to said linear interpolation operation unit, and each of said double buffer memories including a first buffer memory designated for receiving pixel data and a second buffer memory designated for writing image data to its associated block memory, said buffer memories being interchangeable in response to an interchange control signal whereby said first buffer memory is designated to write image data to its associated block memory and said second buffer memory is designated to receive pixel data; and timing control means disposed to receive coordinate data from said linear interpolation operation unit, said timing control means including decoding means for decoding contents of predetermined digits of both said first and second coordinate data from said linear interpolation unit to provide decoded contents, means for generating and applying selection control signals to said double buffer memories according to the decoded contents of said predetermined digits, and means for generating and applying interchange control signals to said buffer memories of said double buffer memories according to the decoded contents of said predetermined digits.

2. An image memory write control apparatus as set forth in claim 1, wherein said timing control means generates interchange control signals based upon decoded contents of predetermined digits of first coordinate data pertaining to said scanline direction and generates selection control signals based upon decoded contents of predetermined digits of second coordinate data pertaining to said direction perpendicular to said scanline direction.

3. An image memory write control apparatus as set forth in claim 2, wherein said timing control means generates control signals according to timing based upon the change of the contents of the least significant digits of coordinate data from said linear interpolation operation unit.

4. An image memory write control apparatus as set forth in claim 3, wherein said timing control means times generation of interchange control signals according to changes of predetermined digits of said first coordinate data which digits represent the capacity of said double buffer memories, and said timing control means times generation of selection control signals according to changes in the contents of the least significant digits of said second coordinate data.

5. An image memory write control apparatus as set forth in claim 2, wherein said timing control means also generates another interchange control signal based upon drawing completion signals supplied from said linear interpolation operation unit.

6. An image memory write control apparatus as set forth in claim 1, wherein each of said block memories has a predetermined storage capacity, and each of said block memories is divided into two portions to which different images are respectively stored.

7. An image memory write control apparatus as set forth in claim 6, wherein said image memory unit is a dual-port dynamic random access memory.

8. A texture mapping apparatus for mapping texture data representative of a desired area on a texture plane to figure data representative of a desired area on a display plane, said apparatus comprising:

texture data holding means for holding texture data;

figure data holding means for holding figure data to be displayed, said figure data holding means comprising a plurality of block memories;

a linear interpolation operation unit for providing texture plane coordinate data, for reading out texture data from said texture data holding means, and for providing display plane coordinate data which provides locations for figure data in said figure data holding means, said display plane coordinate data including first display plane coordinate data pertaining to a scanline direction and second display plane coordinate data which pertains to a direction perpendicular to said scanline direction;

address data providing means for providing sequential address data in synchronism with successive generation of texture plane coordinate data by said linear interpolation operation unit;

temporary holding means for temporarily holding texture data defining a source vector read out from said linear interpolation operation unit according to sequential address data from said address data providing means, said texture data being held by said temporary holding means corresponding to texture plane coordinate data from said linear interpolation operation unit;

a corresponding plurality of texture data supplying means for reading out texture data in a stored order from said temporary holding means in synchronism with generation of display plane coordinate data which define a destination vector formed of figure data corresponding to texture data in an associated source vector, and for supplying read out texture data to said figure data holding means.

each of said texture data supplying means being associated with one of said block memories, and each of said texture data supplying means including a first buffer memory designated for receiving texture data from said temporary holding means and a second buffer memory designated for writing texture data to its associated block memory;

said buffer memories of each of said texture data supplying means being interchangeable in response to an interchange control signal whereby said first buffer memory is designated to write texture data to its associated block memory and said second buffer memory is designated to received texture data from said temporary holding means; and timing control means including means for receiving display plane coordinate data from said linear interpolation operation unit, means for generating selection control signals for selecting one of said texture data supplying means, means for generating interchange control signals for controlling the function of each buffer memory of a selected texture data supplying means, and means for decoding contents of predetermined digits of said first display plane coordinate data and said second display plane coordinate data, said timing control means generating selection control signals and interchange control signals based on the results of decoding said first and second display plane coordinate data by said decoding means.

9. A texture mapping apparatus as set for in claim 8, wherein said texture data holding means and said figure data holding means are provided as a single image memory unit.

10. A texture mapping apparatus as set forth in claim 8, wherein said texture data holding means comprises a plurality of block memories, each block memory of said texture data holding means also including:
- a reading double buffer memory having a buffer memory designated for receiving texture data from its corresponding block memory of said figure data holding means and another buffer memory designated for writing texture data to said temporary holding means, each buffer memory of said reading double buffer memory having interchangeable data receiving writing functions;
- a timing control means for generating interchange control signals for interchanging the function of each buffer memory of said reading double buffer memory, said timing control means of said texture data holding means including decoding means for receiving texture plane coordinate data provided by said linear interpolation operation unit, and for decoding contents of predetermined digits of received texture plane coordinate data, said timing control means generating its interchange control signals based upon decoded received texture plane coordinate data; and
- delay means for delaying receipt of texture plane coordinate data by said reading double buffer memory for a predetermined period of time.

11. A texture mapping apparatus as set forth in claim 10, wherein said delay means includes a FIFO memory and a decoder.

12. A texture mapping apparatus as set forth in claim 10, wherein said delay means includes a decoder and a linear interpolation operation unit.

13. A texture mapping apparatus as set forth in claim 8, wherein said temporary holding means is a static random access memory.

14. A texture mapping apparatus as set forth in claim 8, wherein said temporary holding means is a FIFO memory.

15. A texture mapping apparatus as set forth in claim 8, said timing control means generates interchange control signals based upon decoded contents of predetermined digits of said first display plane coordinate data and selection control signals based upon decoded contents of predetermined digits of said second display plane coordinate data.

16. A texture mapping apparatus as set forth in claim 8, wherein said timing control means generates control signals according to timing based upon changes of contents of predetermined digits of said first and second display plane coordinate data.

17. A texture mapping apparatus as set forth in claim 16, wherein said timing control means times generation of interchange control signals according to changing of the contents of predetermined digits of said first display plane coordinate data which digits represent the capacity of said texture data supplying means, and said timing control means times generation of selection control signals according to changes in the contents of the least significant digits of said second display plane coordinate.

18. A texture mapping apparatus as set forth in claim 17, wherein said timing control means generates another interchange control signal based upon drawing completion signals supplied from said linear interpolation operation unit.

19. A texture mapping apparatus as set forth in claim 8, wherein each block memory of said figure data holding means has a predetermined storage capacity, and is divided into two portions to which different figure data are respectively stored.

20. A texture mapping apparatus as set forth in claim 8, wherein said figure data holding means is a dual-port dynamic random access memory.

* * * * *